US006813530B1

United States Patent
Ives et al.

(10) Patent No.: US 6,813,530 B1
(45) Date of Patent: *Nov. 2, 2004

(54) AUDIO CONSOLE WITH MOTORIZED JOYSTICK PANNING SYSTEM

(75) Inventors: David Ives, Lewisburg, TN (US); Sam Demonbreun, Nashville, TN (US)

(73) Assignee: GLW, Inc., LaVergne, TN (US)

(*) Notice: Subject to any disclaimer, the term of this patent is extended or adjusted under 35 U.S.C. 154(b) by 280 days.

This patent is subject to a terminal disclaimer.

(21) Appl. No.: 09/911,082

(22) Filed: Jul. 23, 2001

Related U.S. Application Data

(63) Continuation of application No. 08/745,016, filed on Nov. 7, 1996, now Pat. No. 6,264,355.

(51) Int. Cl.[7] .............................. G06F 17/00; H04B 1/00
(52) U.S. Cl. ......................................... 700/94; 381/119
(58) Field of Search ........................... 700/94; 381/119; 345/161, 162

(56) References Cited

U.S. PATENT DOCUMENTS

| | | |
|---|---|---|
| 4,479,240 A | 10/1984 | McKinley, Jr. |
| 4,720,805 A | 1/1988 | Vye |
| 5,060,272 A | 10/1991 | Suzuki |
| 5,127,306 A | 7/1992 | Mitsuhashi et al. |
| 5,182,557 A | 1/1993 | Lang |
| 5,243,513 A | 9/1993 | Peters |
| 5,257,317 A | 10/1993 | Stavrou |
| 5,488,669 A | 1/1996 | Zampini et al. |
| 5,768,126 A | 6/1998 | Frederick |
| 5,883,804 A | 3/1999 | Christensen |
| 5,892,938 A | 4/1999 | Eastty et al. |
| 5,914,877 A | 6/1999 | Gulick |
| 6,264,355 B1 * | 7/2001 | Ives et al. |

FOREIGN PATENT DOCUMENTS

WO    WO 87/00331    1/1987

OTHER PUBLICATIONS

Solid State Logic Newsletter describing the SL8000 console from the Solid State Logic Company.
Product Brochure describing the SL9000 J Series console by Solid State Logic Company.
Product brochure describing the Cinemix Console by D&R Electronics.
Five pages of documents representing correspondence between Penny & Giles, Inc. and GLW, Inc.
D. Whittleton and T.Corkerton; A Computer Environment For Surround Sound Programming; 1994; 8/1–8/6.

* cited by examiner

Primary Examiner—Xu Mei
Assistant Examiner—Brian Pendleton
(74) Attorney, Agent, or Firm—Stites & Harbison, PLLC; David W. Nagle, Jr.

(57) ABSTRACT

An audio mixing console having a panning circuit in which panning is controlled by an automated motorized panning joystick. According to the invention, the panning moves can be more easily made with the joystick; stored and played back by using automation and more easily changed and viewed by using a motor to position the joystick. A joystick system panel includes switches and displays to vary the operational mode of the panning system. A touch sensitive joystick provides for instantaneous control of the control functions of the console.

2 Claims, 4 Drawing Sheets

AUDIO CONSOLE WITH MOTORIZED JOYSTICK PANNING SYSTEM

APPLICATION FOR UNITED STATES LETTER PATENT

This application claims benefit and is a continuation of U.S. patent application Ser. No. 08/745,016 filed Nov. 7, 1996, now U.S. Pat. No. 6,264,355 entitled "Audio Console With Motorized Joystick Panning System".

BACKGROUND OF THE INVENTION

This invention relates to professional audio consoles which are used by audio, television, and film production studios in the recording and monitoring of sound and music. More specifically, this invention pertains to multi-channel audio mixing and monitoring consoles which incorporate panning functions that allow the console operator to pan across or "move" the perceived physical location of sounds that are being recorded and/or monitored.

Audio "panning functions" are found in many prior art audio consoles which are used in recording or monitoring environments where changing the perceived physical location of sound is desired. For example, television and film production studios use multi-channel audio consoles which include panning joysticks, trackballs or other pointing devices which are connected to electrical and electronic devices which generate panning control signals representative of physical movement of the pointing device. These devices are then manipulated by the console operator during recording into positions which correspond to a preferred physical location of origin of the sound being recorded or monitored. The panning control signals generated by the pointing device during the manipulation process are then recorded by the audio console automation system in synchronization with the sounds being recorded. The panning control signals are used by the audio console to assign the recorded sounds to one or more audio mixing channels. Accordingly, during playback of the recorded sounds, the perceived physical locations of the sounds correspond to the location selected by manipulation of the pointing-device during recording. The recorded collection of control settings and control setting changes is associated with a time base and, as such, is known in the art as an automated mix.

During playback of sound recordings which include panning information, it would be helpful to generate information to the console operator which concurrently represents the physical location of the sounds being played back. This would allow the console operator to observe the effects of the panning information used by the console during playback. In this way, the operator can receive both aural and visual confirmation that the playback accurately represents the manipulation of the pointing device during recording.

In prior art audio consoles, motorized rotary or linear faders are used so that during playback, the faders are moved to positions which correspond to previously recorded level settings. This replicates movement in one dimension. In the case of pointing devices movable in two dimensions, visual playback of panning movements is not available in the prior art except by use of LED displays which are of limited value because they do not replicate the actual physical movement of the pointing device.

A related shortcoming of prior art audio consoles is an inability to quickly and easily activate the record function of the console while using the panning system.

What is needed, then, is an audio console which is capable of recording and physically replaying the movements of a pointing device used for panning the recorded sound.

SUMMARY OF THE INVENTION

One objective of this invention is to facilitate the incorporation of panning information into an automated audio mix. This is accomplished by coupling a motorized joystick assembly with the panning section of a fully automated mixing console.

In accordance with this objective, the audio console of this invention includes a motorized joystick panning assembly and system that has the capability of translating two dimensional console operator input into two digital words suitable for reading from the automation computer. In addition, the motorized joystick panning system can respond to control information sent from the automation computer and position itself anywhere within its normal range of movement. The panning joystick system and console also contains a means for indicating when the automation computer is controlling the motorized joystick and for allowing the console operator to override control by the automation computer simply by touching the joystick handle. Thus, the motorized joystick system allows the console operator to enter a 'record' mode, so that new information can be incorporated into an automated mix. The console operator can select and verify the status of different modes to simplify the entering and exiting of the 'record' state.

According to another aspect of the invention, the, motorized joystick contains a means for displaying an alphanumeric representation of the console operator supplied name for the particular motorized panning joystick to distinguish it from of others in the system. A second display is representative of the position of the joystick.

The audio console of this invention also contains a means for selecting and displaying the status of the joystick panning system and device, whether in an 'absolute' or a 'relative' mode.

According to another aspect of the invention, the motorized joystick contains a means of placing the pan circuit in an 'in' state.

According to yet another aspect of the invention, the motorized joystick contains a means for entering not only left-right and front-back information but divergence information as well.

The audio console of this invention has 'full automation' such that the panning system hardware is fully controlled by an automation computer. The panning system hardware also contains the means to control the attenuation for up to eight outputs, to allow for any cinema panning mode.

According to another aspect of the invention, the audio console automation computer includes sufficient storage media for any dynamic moves made by the console operator to be recorded, synchronized to SMPTE time code and played back accordingly.

According to another aspect of the invention, the automation computer can store and recall any static position of the panner.

DESCRIPTION OF THE PREFERRED EMBODIMENT

Figure 1:
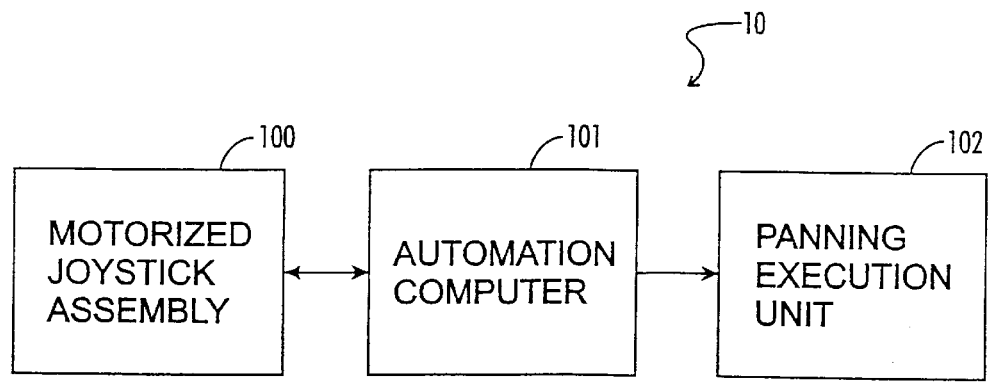
FIG. 1 is a block diagram overview of the audio console of this invention motorized automated panning joystick.

A preferred general functional block arrangement of the audio console 10 of this invention is shown in FIG. 1. Overall control of the console is in the hands of the console operator, supplemented by the automation functions provided by an automation computer 101. The actual hardware used for the automation computer 101 is conventional and can be selected by those familiar with the art depending on the number and complexity of automated console operations the console operator wishes to employ. The automation computer 101 must be programmed, again using conventional programming techniques, to implement the novel automated panning and panning control functions as described below.

Because the audio console 10 of this invention includes an audio panning feature, a panning joystick system 100, and a panning execution unit 102 is electrically interfaced to the automation computer 101. Those skilled in the art will recognize that the general arrangement of the audio console as shown in FIG. 1 is conventional. Accordingly, the joystick system 100 is responsible for translating physical movements of one or more panning joysticks into panning control signals corresponding to a physical position of the joystick. The joystick system 100 will also have separate control and display elements in a joystick system panel. Thus the joystick system 100 generates and displays all data from and to the console operator. The joystick system data is stored and retrieved by the automation computer 101 using conventional data storage, memory, and retrieval hardware and techniques.

The panning execution unit 102, also conventional in design, provides a hardware interface between the automation computer 101 and the multiple panned audio output channels in the console 10. Thus, the panning execution unit 102 receives channel control signals from the automation computer and responds to those signals by adjusting the level of attenuation of audio signals on each panned audio output channel. To carry out this task, the automation computer 101 continually monitors the panning control signals and other joystick system data which represent the current state of the joystick system 100. The joystick system data is processed in real time by the automation computer 101 so that the channel control signals sent to the panning execution unit 102 are constantly updated as needed so that it may control the audio in the appropriate manner.

Figure 3:
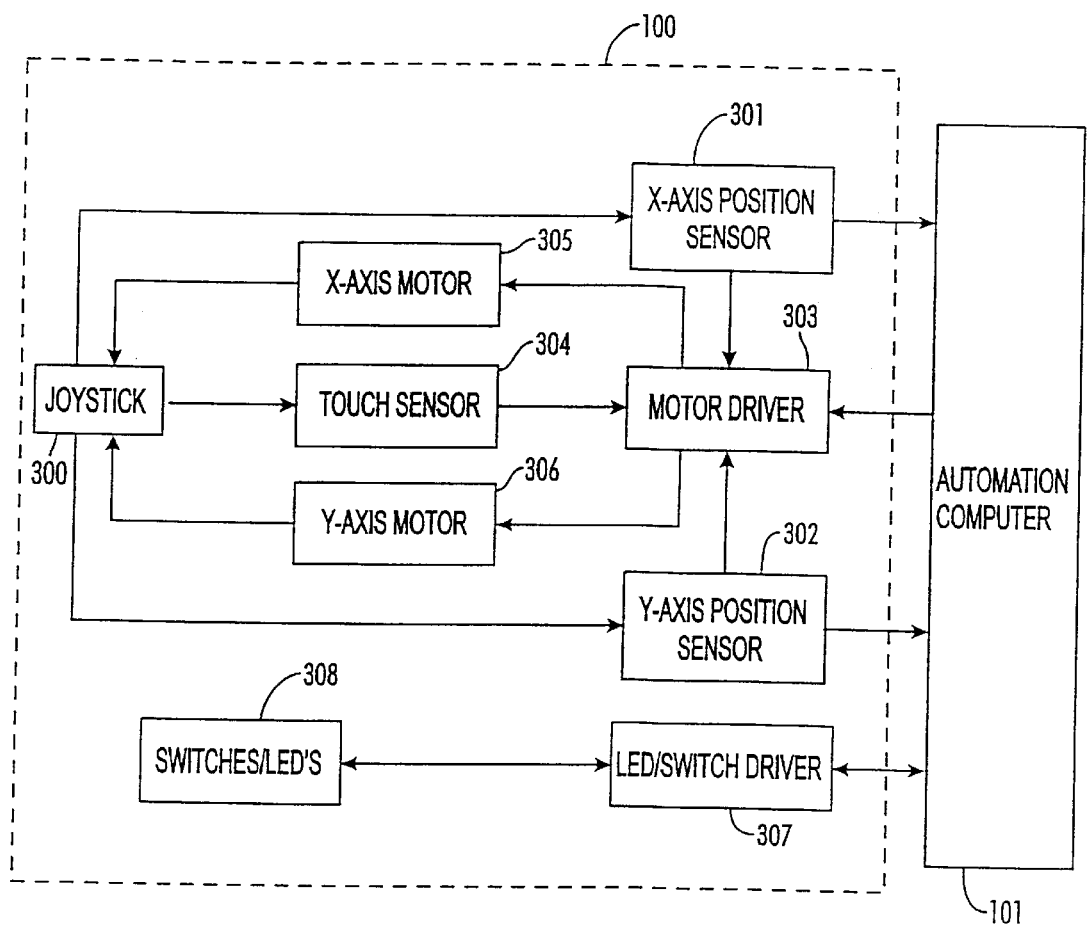
FIG. 3 is a block diagram of the electronic and electromechanical components of the motorized panning joystick system used in a preferred embodiment of the audio console of this invention.

In accordance with a novel feature of this invention, the automation computer 101 can also provide joystick position control signals to the joystick system 100 during playback of an automated mix. FIG. 3 is a block diagram of the motorized joystick system 100. A joystick 300 is formed of a conductive metal rod, conventionally mounted in a way as to provide two degrees of freedom (X and Y). An X-axis position sensor 301 and Y-axis position sensor 302, conventionally potentiometers, are integrated into the mounting mechanism for the joystick 300 in such a way as to provide position sensing on both axis and to provide joystick panning control signals to the automation computer 101 which are representative of the physical position and movement of the joystick 300.

An X-axis joystick motor 305 and Y-axis joystick motor 302 are also mechanically connected to the joystick 300. A motor driver 303 receives joystick position control signals from the automation computer 101 and converts them into motor drive signals which are sent to the X- and Y-axis motors 305 and 306. The joystick motors 305, 306 in turn, respond to the motor drive signals by moving the joystick 300 to the position set by the joystick position control signals.

During playback, the motor driver 303 drives the joystick motors 305, 306 at all times unless the console operator interrupts console control by touching the joystick 300. This function is initiated by a touch sensor 304 which detects when the operator's hand is in contact with the joystick 300 and, upon doing so, sends a signal to motor driver 303. Receipt of this signal interrupts communication of motor drive signals from the driver 303 to the joystick motors 305, 306. The touch sensor 304 also causes the joystick system 100 to send to the automation computer 101 panning control signals corresponding to any changes in joystick position sensed by the position sensors 301 or 302 while the console operator is in contact with the joystick 300. A motorized joystick that will work in this application is available from Penny & Giles, Inc. of Santa Monica, Calif.

The joystick system 100 preferably includes a joystick system control and display panel 308 which is integral to a control operator panel on the console 10. Joystick system panel 308, shown in more detail in FIG. 2, includes switches to receive input from the console operator. Operation of the joystick system panel switches causes the joystick system 100 to send joystick system data to the automation computer 101. Display devices on the joystick system panel 308 respond to commands according to the state dictated by the automation computer 101.

Figure 2:
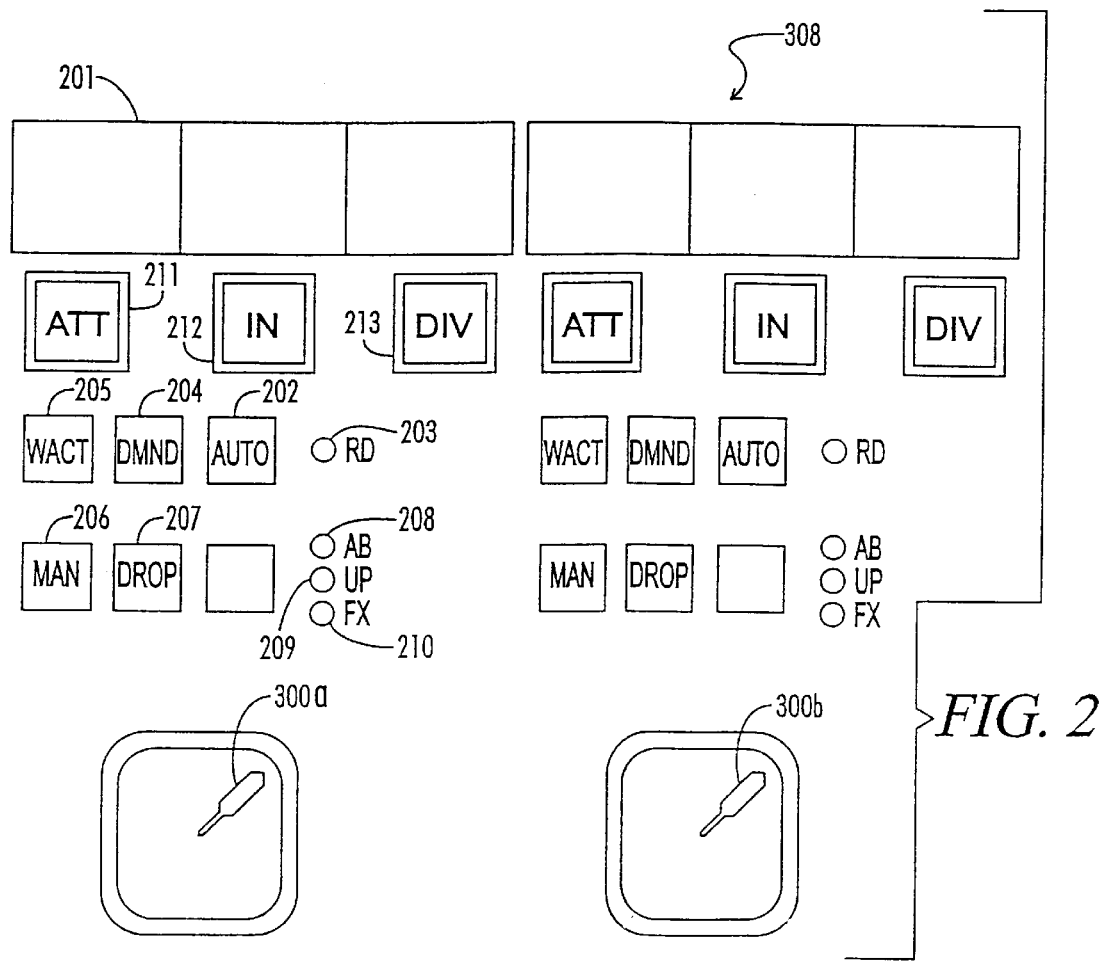
FIG. 2 is a plan view of a portion of the audio console of this invention, showing two motorized panning joysticks and associated joystick system panel.

FIG. 2 is a plan view of a preferred embodiment of the joystick system panel 308 configured with two motorized joysticks 300a and 300b. However, those skilled in the art will recognize that any number of joysticks could diagram of a version of the motorized joystick assembly. For purposes of simplicity and clarity, only one set of switch and display devices on joystick system panel 308 FIG. 2 are labeled. When the audio console 10 is in a record mode, such as to create an automated mix which includes panning data, control of and changes in the panning data are generally initiated by manipulation of the joystick 300. At any time the console operator may relocate the joystick 300 to any desired position. However, depending on the mode of operation of the joystick system 100, as set by the console operator at the joystick system panel 308, the automation computer 101 may not inform the panning execution unit 102 of the movements, and when the console operator releases the joystick 300, move it back to the previous position.

The joystick system panel 308 includes an alphanumeric display 201 which indicates the physical position of its corresponding joystick 300. For example, the display 201 will show "←45" if the joystick 300 is moved to the extreme left. If moved to the extreme right, the display 201 will show "45→". The middle reading will be "0". All points in between are enumerated with numbers between 0 and 45 with an arrow to delineate between left of center and right of center.

Likewise, the alphanumeric display 201 shows similar readings for front to back positions of the joystick 300, using an up arrow and down arrow to distinguish between positions on either side of the center.

Also, a divergence display is contained in the alphanumeric display 201. Divergence, used only in cinema panning modes, is the amount of separation in signal strength from any front speaker feed to any adjacent speaker feed. This is shown in dB's of divergence, from 1 to 63. If the panning execution unit 102 encounters any separation greater that the specified divergence, the lesser signal is brought to within the divergence specified of its greater neighbor.

The console operator may assign a name to a particular joystick 300 to distinguish that particular joystick from the others that may be in the joystick system 101. The joystick name can also be displayed in the alphanumeric display 201.

A write enable button 202 provides the console operator with the ability to initiate a record mode. This record mode informs the automation computer 101 to store any movement of the joystick 300 and to store such movements relative to an incoming SMPTE time code. An SMPTE time code is a method known in the audio recording industry of transmitting and receiving precise time signals for the purposes of synchronizing multiple audio storage devices. All buttons on the joystick system panel 308 have an integral LED that is under control of the automation computer 101 to provide feedback.

A read display 203 indicates when panning control signals have been recorded to the automation computer during the current time code. While display 203 is on, the automation computer 101 is in control of the general audio console panning system. The console operator cannot override this setting unless he enters the 'record' mode using the write enable button 202. If the read display 203 is on and the console operator moves the joystick 300, the automation computer 101 will not allow the panning system to respond to the movements. The joystick motors 305, 306 will move the joystick 300 back in position when the joystick is released.

The demand button 204 provides the console operator with a method to automatically enter and exit the record mode (turning on and off the write enable button), in response to the console operator touching and releasing the joystick 300. This is useful when the recorded information is correct except for a small section. When the incorrect section is reached during playback, the console operator may touch the joystick 300. In response to the touch sensor 304 sends a signal to the automation computer which causes it to automatically enter the record mode and write the new information. The operator can then release the joystick 300 to stop recording and review the recorded information.

The write active button 205 provides the console operator with a method to automatically enter the record mode based upon the console operator touching the joystick 300.

The manual button 206 allows the console operator to override the automation data with his own without recording over the automation data.

The drop button 207 allows the console operator to automatically exit the record mode. If the console operator presses the drop button 207 and moves the joystick 200 to meet or cross over the previously recorded data, the write enable button 202 turns off and the recording stops. If the console operator presses drop button 207 and releases the joystick 300, the joystick 300 will change position according to a specified time or rate to equal the previously recorded data. This provides a method of recording new information without injecting a 'jump' in the data when the recording stops.

The absolute display 208 is active when the joystick system 100 is in the absolute mode, the normal mode of operation. In contrast, the update display 209 is active when the joystick system 100 is in an update mode, used when the console operator would like to use the joystick in a relative fashion. In the update mode, all moves that are entered are added to, or subtracted from, the previously recorded panning control signal data and stored. The fixed display 210 indicates when the console operator is in the update mode and would not like to 'chase' the joystick 300. It causes the joystick 300 to remain stationary so that the console operator can input his relative moves.

The pan-in button 212 is used to enable and disable panning. If the button is inactive, the panning execution unit 102 sets the attenuation levels to send the same amount of audio signal through to all channel outputs. If the pan-in button 212 is active, the panning execution unit 102 will generate channel control signals to adjust the attenuation levels to send varying amounts of signal to the eight outputs based on the panning mode selected.

The divergence button 213 is used to place the joystick system 100 into the a divergence mode. While in divergence mode, left to right movements of the joystick 300 will generate divergence control signals which alter the amount of divergence.

Figure 4:
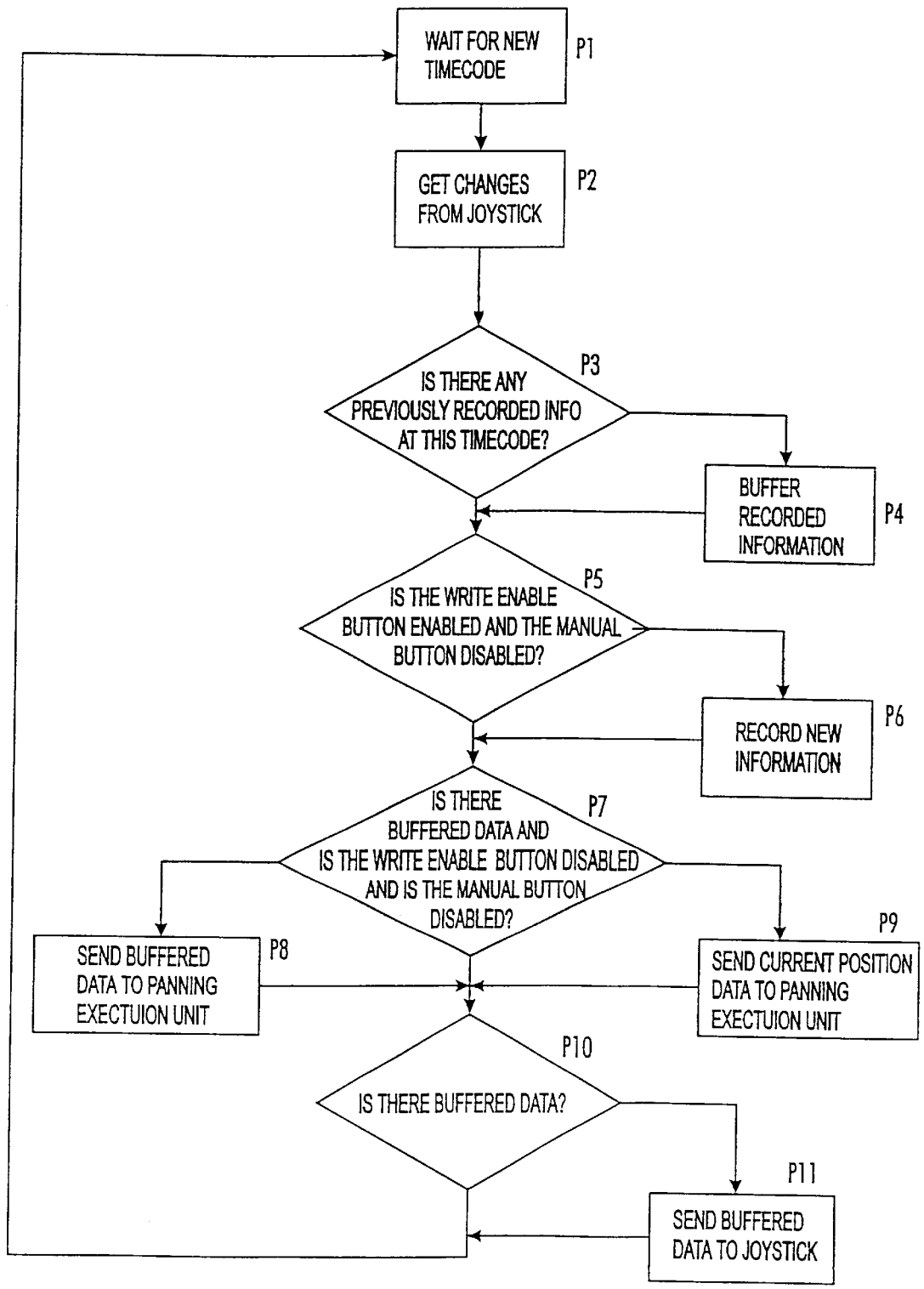
FIG. 4 is a flowchart which illustrates the sequence of steps performed in the communication loop of the automation computer as used in the audio console of this invention.

FIG. 4 is a flowchart showing the operation of the automation computer 101 as it relates to the panning functions of the audio console 10. The automation computer 101 operates in a loop fashion. Each time through the loop, the automation computer 101 must read and respond to changes in panning control signals generated by the motorized joystick system 100, store and play back changes as the operational modes dictate, and send the correct channel control signals to the panning execution unit 102.

The loop starts with the automation computer 101 receiving a beginning of frame command (P1) from a conventional external time code source (not shown). The automation computer 101 then receives any changes in panning control signals from the joystick system 100 (P2). If there is previously recorded data (including panning control signals) from the joystick system 100 (P3), it is buffered for transmission back to the joystick system 100 and to the panning execution unit 102 in the form of channel control signals (P4). If the write enable button 202 is enabled and the manual button 206 is not (P5), the current position of the joystick 300 is stored (P6). If there is buffered data and the write enable button 202 is not enabled, and the manual button 206 is not enabled (P7), buffered data is sent to the panning execution unit 102 (P8), else the current position data is sent (P9). If there is buffered data (P10), it is sent to the joystick system 100.

When the stored panning control signals are transmitted back to the joystick system 100 concurrently with transmission of channel control signals to the panning execution unit 102, the motor driver 303 converts them to joystick position control signals. The Joystick motors 305, 306, then cause the joystick 300 to move in accordance with the previously recorded movements. In this way, the operator receives visible confirmation of whether the panning implemented by the audio console 10 accurately corresponds to the original movement of the joystick 300.

Figure 5:
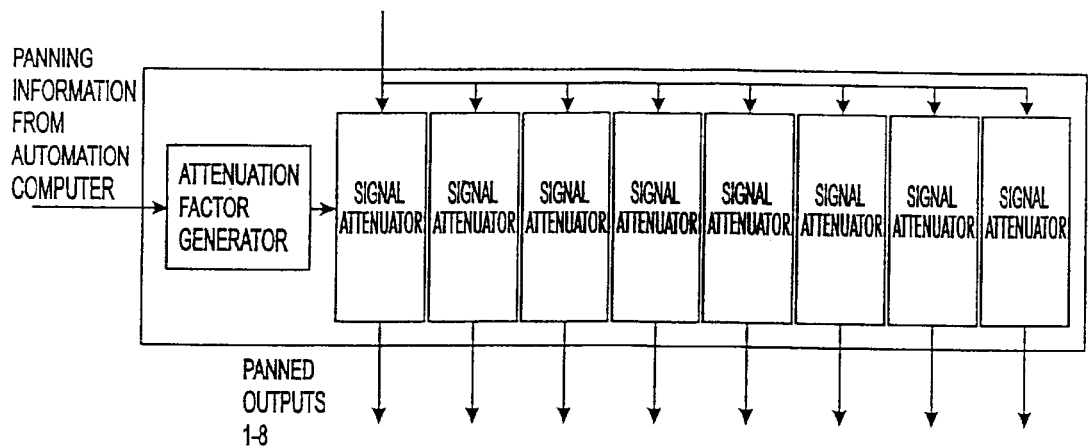
FIG. 5 is a block diagram of an eight channel panning execution unit as used in a preferred embodiment of the audio console of this invention.

FIG. 5 shows the panning execution unit 102. The panning information is received from the automation computer 102 in the form of channel control signals. These signals correspond to activation of the pan-in button 212, and left-right control, front-back control, and divergence, as set by manipulation of the joystick 300. The panning execution unit 102 sets the attenuators according to the selected panning mode.

All panning modes are combinations of a monaural (one), stereo (two), three, or five speakers placed in front of the listener, and zero, one or two speakers place in back of the listener. In the case of single speakers, the attenuation is the same irrespective of the panning data. In the case of two speakers, the attenuation is implemented in accordance with the relationship shown in FIG. 6. In the case of three speakers, the attenuation is as if two stereo speaker systems were placed side by side, but there is only one speaker in the center. In this mode, panning to the left of center turns off the right speaker, and vice-versa. In the case of five speakers, it is as if four stereo systems were placed side by side.

Figure 6:
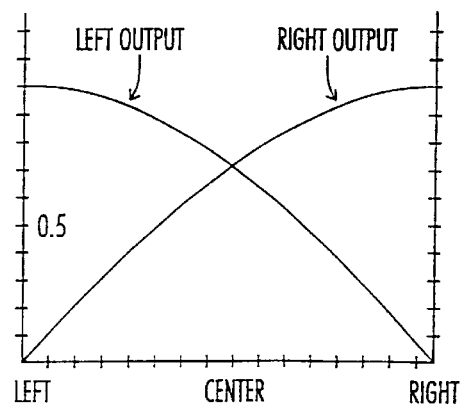
FIG. 6 is a graphical representation of a stereo panning function curve.

The front to back information is added into the speakers if there are speakers in the back. The curve in FIG. 6 is used to define the attenuation of all front and back outputs in the same fashion as the left to right panning.

The divergence information and divergence controls signals are used to 'spread' the signal out across the front speakers. Divergence is the amount of separation in signal strength from any front speaker feed to any adjacent speaker feed. If the panning execution unit 102 encounters any separation greater that the specified divergence, the lesser signal is brought to within the divergence specified of its greater neighbor.

The panning outputs can be freely assigned as any of the speaker feeds.

Although a preferred embodiment of the audio console of this invention has been described by reference to use of a motorized joystick, control of panning in the console can be provided by other manually operated pointing devices without departing from the scope of this invention, as long as means are included for causing physical movement of the pointing device in accordance with recorded panning control signals.

Thus, although there have been described particular embodiments of the present invention of a new and useful audio console with motorized joystick panning system, it is not intended that such references be construed as limitations upon the scope of this invention except as set forth in the following claims.

What is claimed is:

1. A joystick system for controlling panning functions of a mixing console comprising:
   a. a joystick movable in at least two dimensions including a first-axis and a second-axis;
   b. a first-axis position sensor and a second-axis position sensor, the first-axis and second-axis position sensors combining to sense various positions of the joystick and produce corresponding joystick position signals which are recorded and played back by the audio console to control panning;
   c. a first-axis motor and a second-axis motor connected to the joystick; and
   d. a motor driver which receives joystick position signals recorded by the console and, in response to playback the recorded joystick position signals, causes the first-axis and second-axis motors to move the joystick into the positions corresponding to the joystick position signals as they are played back during panning.

2. A joystick system as recited in claim 1, wherein the joystick is touch sensitive, and in response to touching of the joystick, generates a signal to the console to activate recording of the joystick position signals.

\* \* \* \* \*